US012033813B2

(12) United States Patent
Freundt et al.

(10) Patent No.: US 12,033,813 B2
(45) Date of Patent: Jul. 9, 2024

(54) VACUUM SWITCHING DEVICE FOR MEDIUM- AND HIGH-VOLTAGE APPLICATIONS

(71) Applicant: SIEMENS ENERGY GLOBAL GMBH & CO. KG, Munich (DE)

(72) Inventors: Karsten Freundt, Falkensee (DE); Christian Schacherer, Deining (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 373 days.

(21) Appl. No.: 17/434,816

(22) PCT Filed: Feb. 25, 2020

(86) PCT No.: PCT/EP2020/054814

§ 371 (c)(1),
(2) Date: Aug. 30, 2021

(87) PCT Pub. No.: WO2020/173894

PCT Pub. Date: Sep. 3, 2020

(65) Prior Publication Data

US 2022/0102084 A1 Mar. 31, 2022

(30) Foreign Application Priority Data

Feb. 28, 2019 (DE) ..................... 10 2019 202 741.5

(51) Int. Cl.
*H01H 1/58* (2006.01)
*H01H 33/66* (2006.01)

(52) U.S. Cl.
CPC ...... *H01H 1/5833* (2013.01); *H01H 33/6606* (2013.01)

(58) Field of Classification Search
CPC ............... H01H 1/5833; H01H 1/5822; H01H 2001/5827; H01H 33/6606; H01H 2033/6613
(Continued)

(56) References Cited

U.S. PATENT DOCUMENTS 4,124,790 A * 11/1978 Kumbera ............. H01H 33/666 218/138
4,150,270 A * 4/1979 Zunick ................... H01H 33/66 218/138
(Continued)

FOREIGN PATENT DOCUMENTS

CN 1524278 A 8/2004
CN 202888710 U 4/2013
(Continued)

*Primary Examiner* — William A Bolton
(74) *Attorney, Agent, or Firm* — Laurence A. Greenberg; Werner H. Stemer; Ralph E. Locher

(57) ABSTRACT

A vacuum switching device for medium or high voltages contains two contacts. At least one contact of which is mechanically movably mounted by a drive rod and thus is in electrical contact with the drive rod. The vacuum switching device has a vacuum chamber in which the contacts are arranged. The vacuum switching device has a spring contact, which is outside the vacuum chamber, and the drive rod, when the contacts are closed, is in electrical contact with a power line via the spring contact, and in that the spring contact, when the contacts are open, is electrically insulated from the drive rod.

9 Claims, 9 Drawing Sheets

(58) Field of Classification Search
USPC ................. 218/123, 118, 134, 139, 140, 146
See application file for complete search history.

(56) References Cited

U.S. PATENT DOCUMENTS

| | | | | |
|---|---|---|---|---|
| 4,618,749 | A * | 10/1986 | Bohme ............ H01H 33/66207 218/134 | |
| 4,684,771 | A | 8/1987 | Wuethrich | |
| 7,115,831 | B2 * | 10/2006 | Chyla ................ H01H 33/6606 218/124 | |
| 8,723,070 | B2 * | 5/2014 | Yoshida ............. H02B 13/0354 218/155 | |
| 2003/0173336 | A1 * | 9/2003 | Thursesson ............ H01H 33/36 218/118 | |
| 2004/0040935 | A1 | 3/2004 | Heimbach et al. | |
| 2008/0302765 | A1 | 12/2008 | Renz et al. | |
| 2010/0307901 | A1 | 12/2010 | Maruyama et al. | |

FOREIGN PATENT DOCUMENTS

| | | | |
|---|---|---|---|
| DE | 579464 | C | 6/1933 |
| DE | 1133785 | B | 7/1962 |
| EP | 0161349 | A2 | 11/1985 |
| JP | S4815151 | U | 2/1973 |
| JP | S50157879 | A | 12/1975 |
| JP | 2004519836 | A | 7/2004 |
| WO | 2007051436 | A1 | 5/2007 |
| WO | 2016001328 | A1 | 1/2016 |

* cited by examiner

VACUUM SWITCHING DEVICE FOR MEDIUM- AND HIGH-VOLTAGE APPLICATIONS

FIELD AND BACKGROUND OF THE INVENTION

The invention relates to a vacuum switching device for medium- or high-voltage applications as claimed in the independent claim.

In medium- and high-voltage switching devices, in order to close and open the circuit, a contact system is used, which comprises two opposite contacts, wherein one of the two contacts is generally a stationary contact (fixed contact) and the other contact is a moving contact. To close the switching device, the movable contact is moved toward the fixed contact by a drive. This switching operation must not take place at an arbitrarily slow pace since shortly before the contacts meet an arc arises, known as the "making". This can cause the contact surfaces to melt. Subsequently, the contacts mechanically meet one another and the residual kinetic energy is dissipated substantially by deformation of the contacts and by bouncing. After the molten contacts have mechanically closed, they can fuse together since slight melting has occurred at the contact surfaces shortly before they meet. When the contacts are reopened, these can then be damaged by what is known as a separating shock.

In the limit case, the closing movement can be described as a ballistic movement in which the moving contact is initially accelerated significantly by a strong drive spring and then moves toward the opposite side substantially on account of inertia. In fact, the spring drive also exerts a certain drive force $F_{drive}$ on the contact during the movement. During the movement, the acceleration thus nevertheless decreases and can tend toward zero.

For electrical insulation between the open contacts in the contact system, there are fundamentally different approaches that can be explained by what is known as Paschen's law. Paschen's law states that in a homogeneous field, the breakdown voltage is a function of the product of gas pressure and electrode spacing. In other words, the contacts can be insulated well with a gas or a gas mixture at a high pressure with as small a contact spacing as possible. The second possibility is a very low gas pressure, a technical vacuum at about $10^{-6}$ bar (abs). Accordingly, the switches are referred to as gas switches or as vacuum switches.

In vacuum switches, vacuum tubes having the switching contacts are fitted in a gas space enclosing the vacuum tube for electrical insulation with respect to the switch housing or the electrical contacts of the vacuum tube. Compared with gas switches, vacuum tubes have the advantage that they have a very high switch-off capability and a relatively small contact spacing. Furthermore, decomposition and melting products during switching operations do not impair the surrounding insulation, on account of the vacuum encapsulation. The contacts of the vacuum tube are brought into contact in particular at the moving contact usually via a flexible conductor line.

A drawback of vacuum tubes relates to the contact surfaces, which are located parallel opposite one another. If the moving contact bounces too quickly or with too much kinematic energy against the fixed contact, it is possible, as described, for damage to the vacuum switching tube to occur. Furthermore, in the event of too high a striking speed, they can fuse together after closing. In the event of excessively slow closing, burns at the contact surfaces can occur.

A further drawback of a vacuum insulation section is the unavoidable occurrence of what are known as non-sustained disruptive discharges (NSDD). These discharges have different causes that are difficult to avoid with conventional designs. This is due, among other things, to the mean free path length in the vacuum. Since, at a pressure of $10^{-6}$ bar, there are virtually no molecules or particles between the contacts, which could slow down a charge attenuation from one contact to the other or could even absorb the charge.

SUMMARY OF THE INVENTION

The object of the invention is thus to avoid or reduce the two abovementioned drawbacks of the vacuum tube, namely, for the one part, the occurrence of NSDD and, for the other part, a possible fusing, caused by an arc, of the switching contacts.

The object is achieved by a vacuum switching device for medium- or high-voltage applications having the features of the independent claim.

The vacuum switching device according to the invention for medium or high voltage has two contacts, of which at least one is mounted so as to be mechanically movable via a drive rod and at the same time is electrically connected to the drive rod. Furthermore, the vacuum switching device has a vacuum space in which the contacts are arranged. The invention is noteworthy in that the vacuum switching device has a spring contact, which is arranged outside the vacuum space, and the drive rod, in a closed state of the contacts, is electrically connected to a power line via the spring contact. Furthermore, the spring contact, in an open state of the contacts, is electrically insulated from the drive rod.

The described combination of features has the effect that, as a result of the spring contact bearing against the drive rod, deliberate friction between the spring contact and the drive rod can be set, such that an appropriate resistance occurs during the movement of the drive rod, and bouncing of the contacts when they meet one another can be minimized. In addition, in an open position of the contacts, the current path is doubly interrupted. Firstly between the two contacts and also between the spring contact and the drive rod, since these are electrically insulated from one another in the open state. In this way, the problem of what is known as non-sustained disruptive discharge can be reduced statistically to virtually zero.

To control and set a deliberate mechanical resistance between the spring contact and the drive rod during a closing movement of the contacts, it is expedient that the drive rod has a cross-sectional contour that varies along a switching axis. In this way, for example the resistance for the movement of the drive rod in translation is increased when the cross section increases in the direction of movement, such that the spring contact is compressed.

Furthermore, it is expedient when the drive rod has, along a switching axis, an electrically insulating region and an electrically conducting region. In the open state of the contacts, the spring contact then bears against the electrically insulating region of the drive rod, and in the closed state it bears against the electrically conducting region. In this way, during a closing operation, the spring contact can travel along the drive rod in a simple sweeping movement.

In an alternative configuration of the invention, the spring contact, in the open state of the contacts, is arranged in a contact-free manner with regard to the drive rod. This means that there is insulation in the form of an insulating gas between the spring contact and the drive rod, since the spring contact is arranged outside the vacuum space.

In a further embodiment of the invention, it is expedient that the cross-sectional contour of the drive rod is thickened in such a way that, during a closing movement of the drive rod along the switching axis, electrical contact is made between the drive rod and the spring contact. This thickening of the cross-sectional contour occurs in a thickening region of the drive rod, this serving for the spring contact to be compressed and thus for the closing movement to be slowed by way of the friction. This is configured in particular such that this thickening is engaged with the spring contact shortly before the two contacts meet one another. Here, it is in turn expedient that the spring contact is subjected to elastic deformation while the electrical contact is being made, since, as a result of the elastic deformation, friction energy can be introduced reversibly into the movement of the drive rod, this having a positive effect on the deceleration movement.

Furthermore, it is expedient that the cross section or the cross-sectional contour of the drive rod narrows again along the switching axis on a side facing away from the contact after maximum thickening. This has the effect that, after the maximum thickening and the maximum deceleration, the spring contact bears against the drive rod such that it presses against it in a sustained manner and thus a pressure force acts on the closed contacts. This occurs in particular when the spring contact bears in an elastically deformed state against the narrowing region of the cross section or of the cross-sectional contour of the drive rod.

The varying cross-sectional contour of the drive rod is preferably configured in a rotationally symmetric manner, but it is also possible for other non-symmetric cross-sectional variations to occur, which result in engagement of the drive rod with the spring contact.

In a further embodiment of the invention, it is expedient that an electrically conducting region of the drive rod a defined potential is settable via a potential controller on the drive rod.

Further embodiments of the invention and further features are explained in more detail by way of the following description of the figures. These are schematic, purely exemplary examples, which have no limiting effect on the scope of protection.

DETAILED DESCRIPTION OF THE INVENTION

Figure 1:
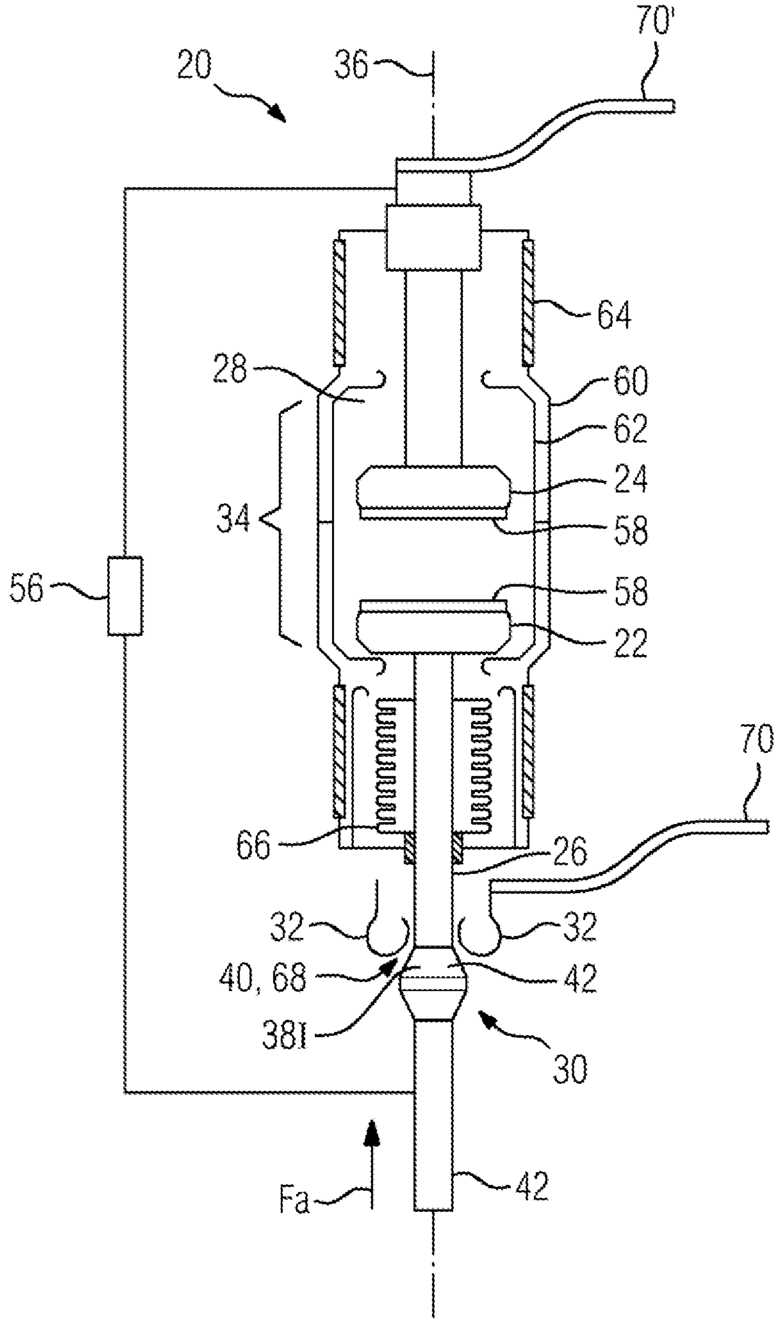
FIG. 1 shows a vacuum switching tube in the open state of the contacts and electrical gas insulation between the drive rod and a spring contact.

FIG. 1 depicts a vacuum switching device 20, which has a vacuum space 28 in which two contacts, a moving contact 22 and a fixed contact 24 are arranged. The moving contact 22 is connected to a drive rod 26, via which the contact 22 is also electrically contacted. The drive rod 26 of the moving contact 22 is in turn in mechanically operative engagement with a drive (not illustrated here). The vacuum switching device 20 also has a housing 60 on which vapor shields 62 are arranged, and the vacuum space 28 furthermore has insulations 64, which are generally represented in the form of rotationally symmetric ceramic components. Furthermore, to seal off the drive rod 26 with respect to the gas space 30 located outside the vacuum space 28, use is made of a vacuum bellows 66. The gas space 30 is in this case, here too, a closed-off space in which a specified insulating gas is present, wherein the insulating gas can be for example simple air or an additionally dielectrically acting insulating gas, for example a fluoroketone or a fluoronitrile. In principle, however, it is also possible for the vacuum space 28 of the vacuum switching device 20 to be in a free environment, for which reason the outside atmosphere in which the vacuum switching device is located can be considered to be the gas space 30.

Figure 9:
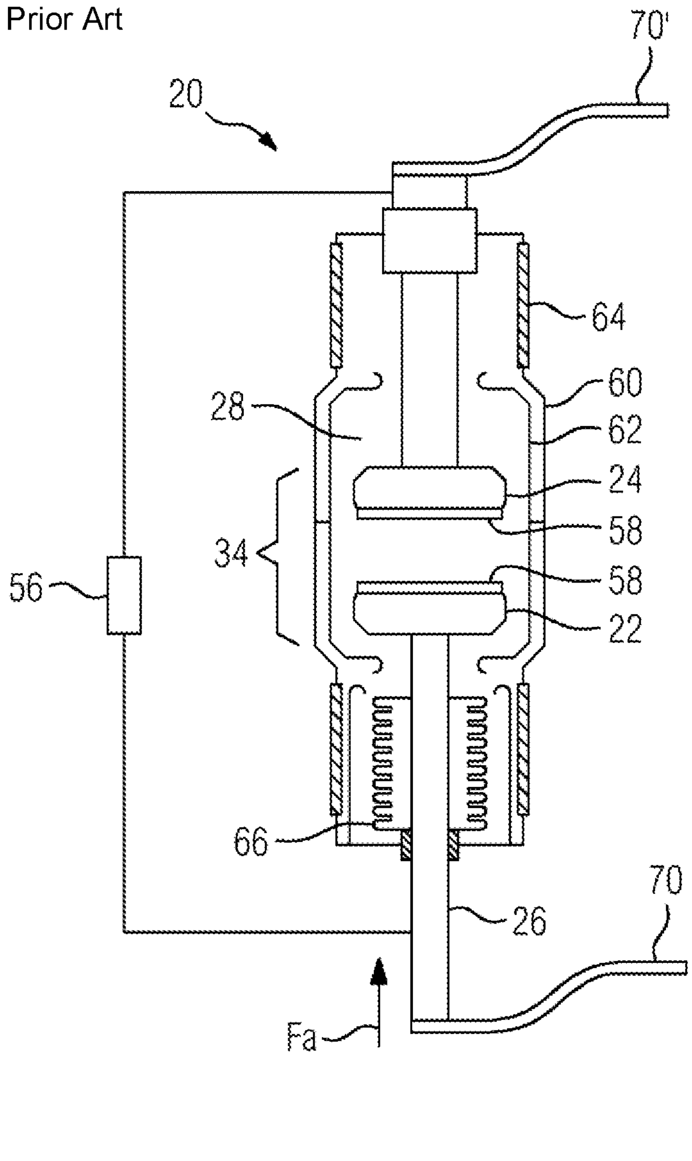
FIG 9 Prior Art
FIG. 9 shows a vacuum switching tube according to the prior art with corresponding contacting of the drive rod according to the prior art.

To this extent, the described vacuum switching device 20 according to FIG. 1 is configured analogously to a vacuum switching device according to the prior art, which is illustrated by way of example in FIG. 9. The vacuum switching device according to FIG. 9 has in this case a conductor line 70, which is directly connected to the drive rod 26 and is thus permanently in electrical contact therewith.

In contrast to this embodiment according to FIG. 9 and the prior art, for electrical contacting of the drive rod 26, use is made of a spring contact 32, which is schematically illustrated in FIG. 1 and is in turn electrically connected to a further electric conductor, for example the above-described conductor line 70 known from the prior art. FIG. 1 illustrates an open state 34 of the contacts 22 and 24, wherein, in this state, the spring contact 32 which is located outside the vacuum space 28 in the gas space 32, is arranged at a distance from the drive rod 26. The distance of the spring contact 32 from the drive rod 26 is large enough that no electrical contact is made in this state 34. Between the spring contact 32 and the drive rod 26 there is an insulating gas, for example synthetic air.

Figure 2:
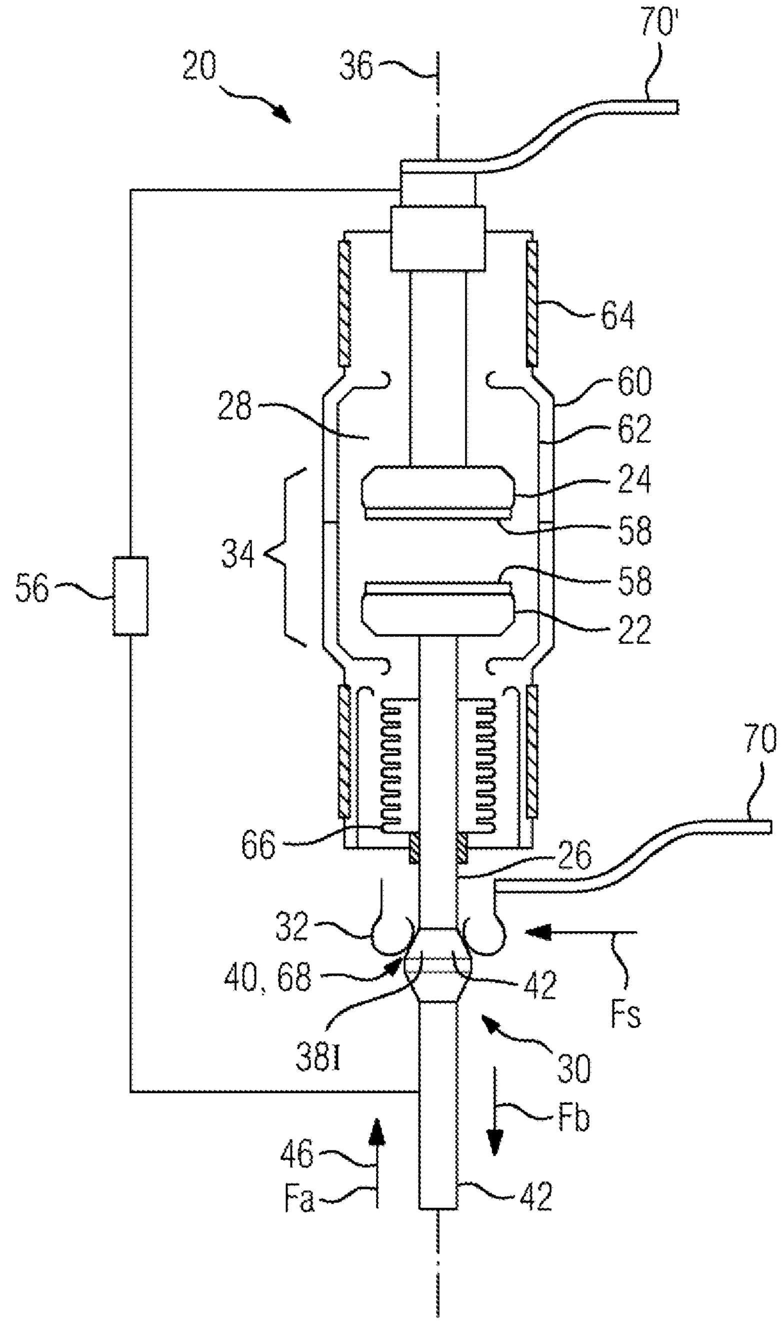
FIG. 2 shows the vacuum switching tube according to FIG. 1 in a half-closed state of the contacts and bearing spring contact.

On a side of the spring contact facing away from the contacts 22 and 24 there is a variation in the cross-sectional contour 38 of the drive rod 26. If, as illustrated in FIG. 2, a movement takes place along the arrow $F_a$, mechanical engagement of the spring contact 32 with the drive rod 26, or the varying cross-sectional contour 38-I thereof, occurs. Thus, the spring contact 32 is elastically deformed, this being expressed by the spring force $F_a$. Furthermore, as a result, a further force $F_b$ occurs, which can be referred to as braking force and counteracts a closing movement 46 along a switching axis 36.

The braking force $F_b$ that arises on account of the described engagement prevents the moving contact 22 from striking the fixed contact 24 too heavily, this considerably reducing undesired bouncing, known from the prior art, of the two contacts 22 and 24.

Figure 3:
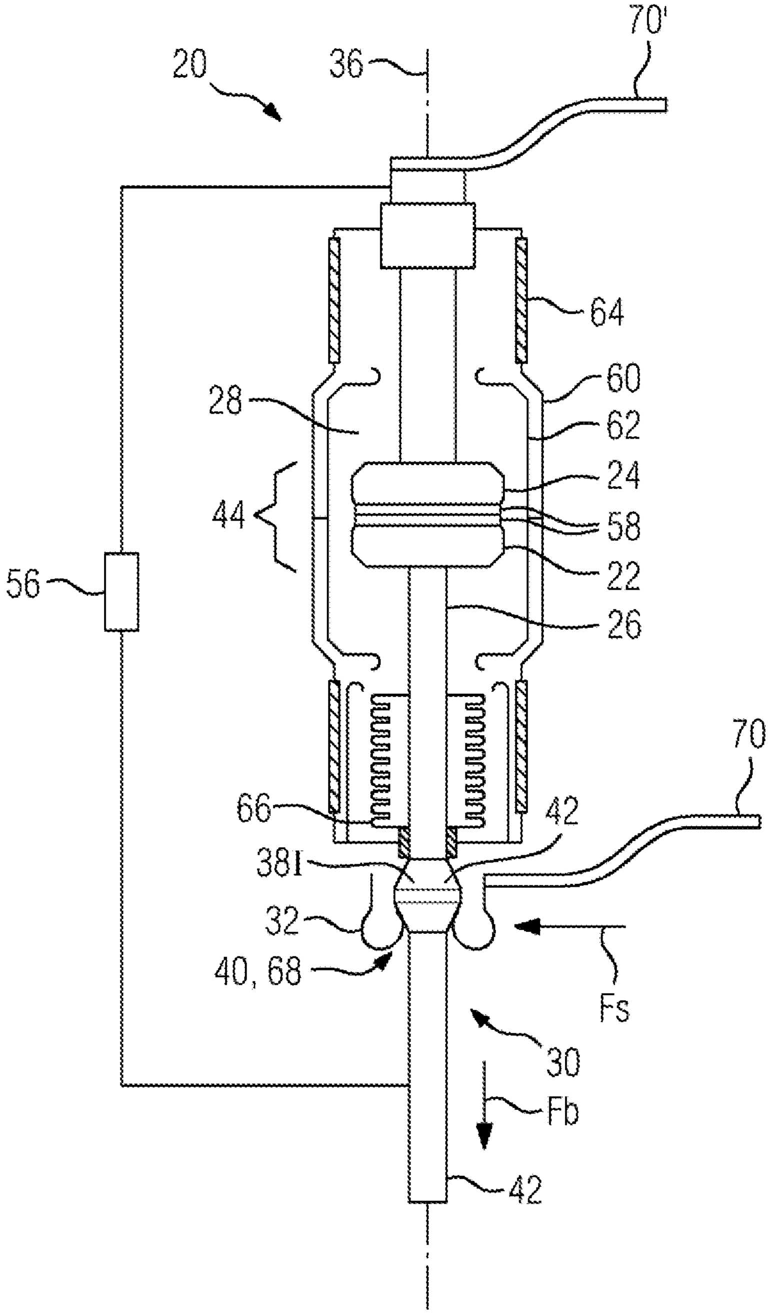
FIG. 3 shows the vacuum switching tube according to FIGS. 1 and 2 in the closed state of the contacts.

Furthermore, FIG. 3 illustrates a closed state 44 of the contacts 22 and 24, wherein the cross-sectional contour 38 narrows again after a region of the maximum thickening 50 (FIG. 4) such that the spring contact 32 bears against the drive rod 26 in such a way that the contact system with the contacts 22 and 24 is pressed closed, this again preventing bouncing in a closed state since reopening of the contacts 22 and 24 is prevented by the pressure force $F_b$.

Figure 4:
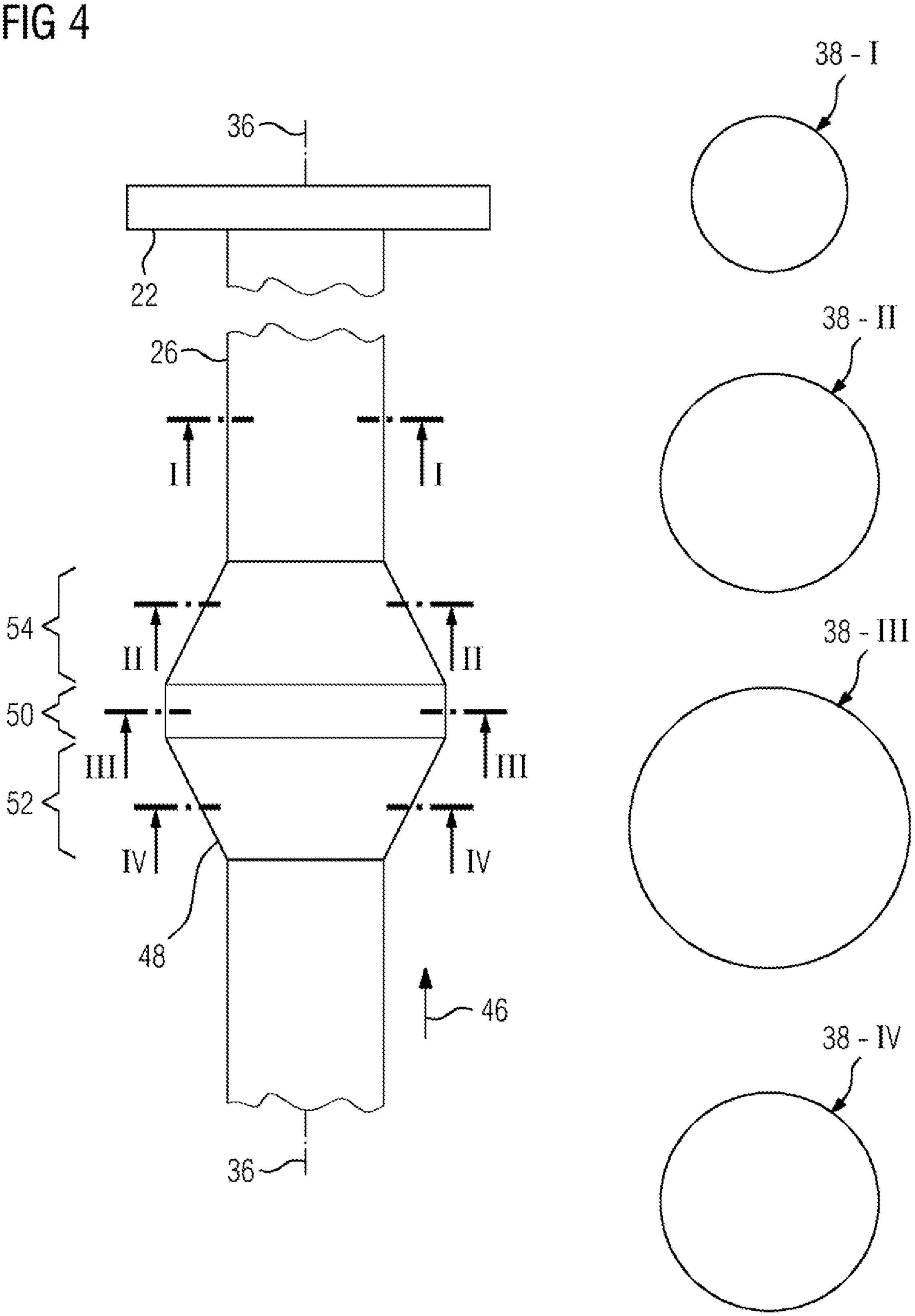
FIG. 4 shows a section through the varying cross-sectional contour of the drive rod with the respectively bearing cross sections.

FIG. 4 shows an enlarged schematic illustration of the drive rod 26 and the cross-sectional contour 38-I to IV thereof, explaining the individual stations from FIGS. 1 to 3 in more detail. In this case, the spring contact (not illustrated in FIG. 4 for the sake of clarity) is located, in the open state 34 of the contacts 22 and 24, as is illustrated in FIG. 1, approximately at the level of the cross-sectional contour 38-I. In this case, there is also electrical insulation between the spring contact 32 and the drive rod 26. Subsequently, the drive rod 26 moves upward along the switching axis 36 in the illustration according to FIG. 4, with the result that, in the cross-sectional contour 38-II, contact of the spring contact 32 with the drive rod 26 occurs. In the process, the drive rod 26 completes a closing movement in the direction of the arrow 46. In this state, deceleration of the drive rod 26 occurs on account of the elastic deformation and the pressing of the spring contact 32 in the region 38-II. The region 38-II is followed along the closing movement 46 by a region 38-III, which represents a maximum cross-sectional contour of the drive rod 26. This is where the region of the maximum thickening 50 is located. As the closing movement 46 continues, the spring contact 32 slides over the region 50 and arrives in a region 52 which again has a narrowing cross-sectional structure, which is provided with the reference sign 38-IV. In this region 52, the spring contact 32 bears, still in an elastically deformed state, against the drive rod 26 and brings about a force on the contacts 22 and 24 that keeps them closed.

The vacuum switching device 20 described in FIGS. 1 to 4 has the following advantages compared with the prior art. Firstly, the current path is doubly interrupted, namely between the contacts 22 and 24 and between the drive rod 26 and the spring contact 32. This allows the NSDD to be virtually ruled out statistically. In addition, on account of the specific construction of the drive rod and the engagement thereof in the spring contact 32 in the form described, bouncing of the contacts 22 and 24 when they meet is reduced so greatly that fusing and damage of contact faces 58 of the contacts 22 and 24 are considerably reduced.

Figure 5:
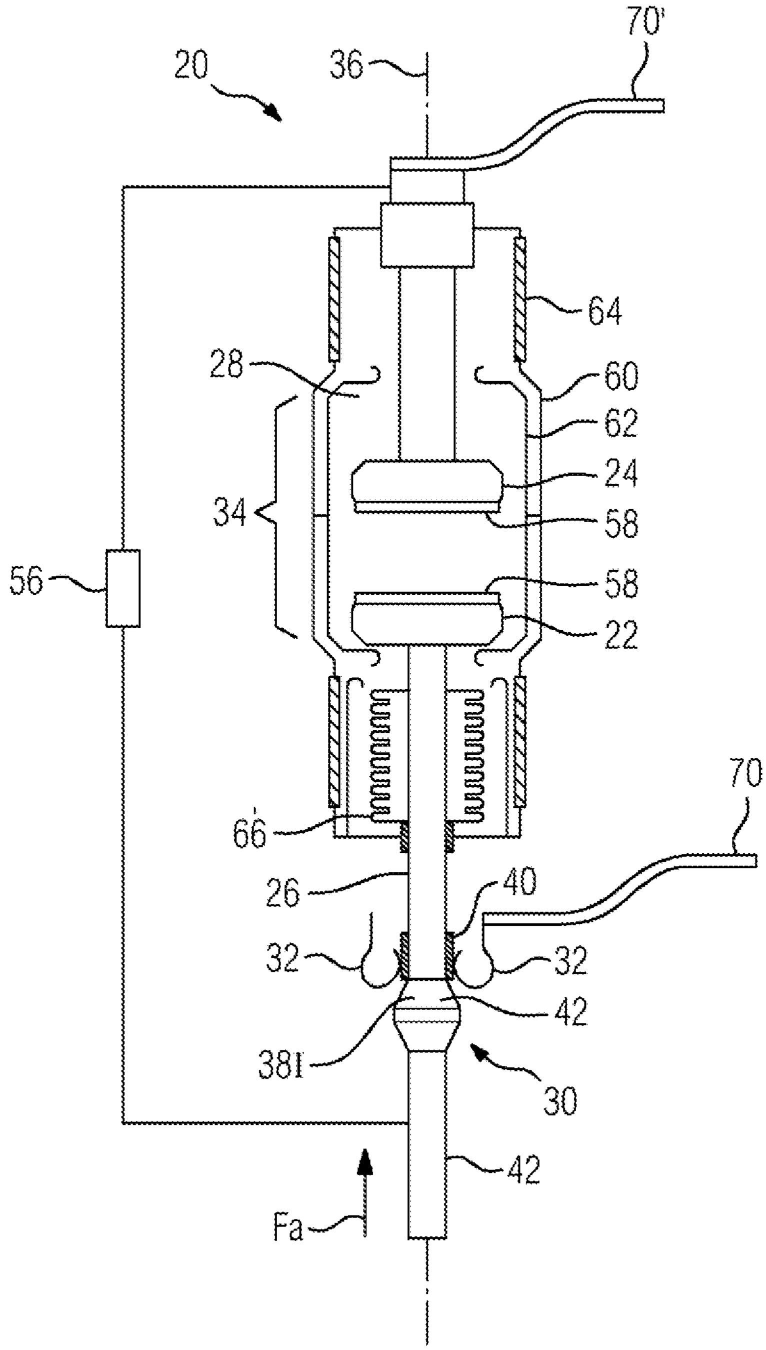
FIGS. 5 to 7 show analogous illustrations to FIGS. 1 to 3 with solid-body insulation between the electrically conducting drive rod and the spring contact in the three different states as in FIGS. 1 to 3.
Figure 6:
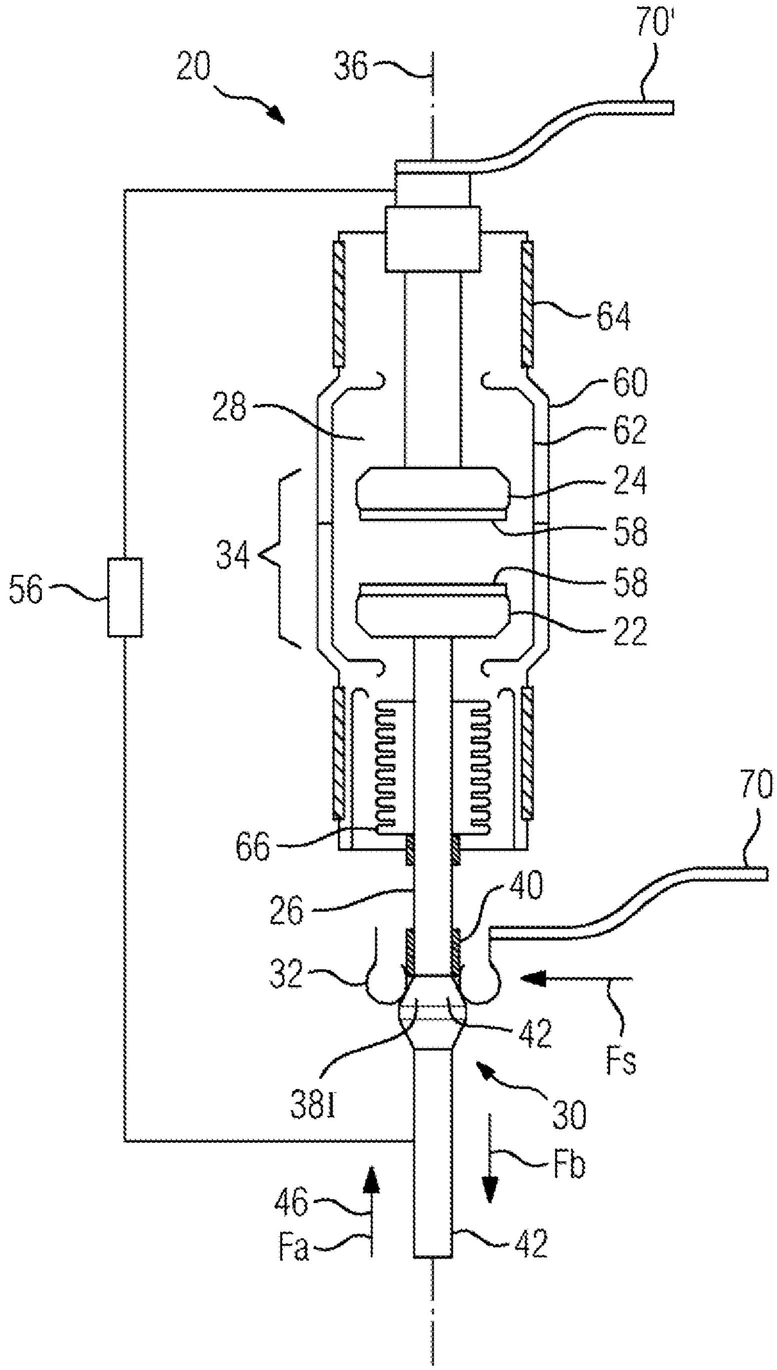
Figure 7:
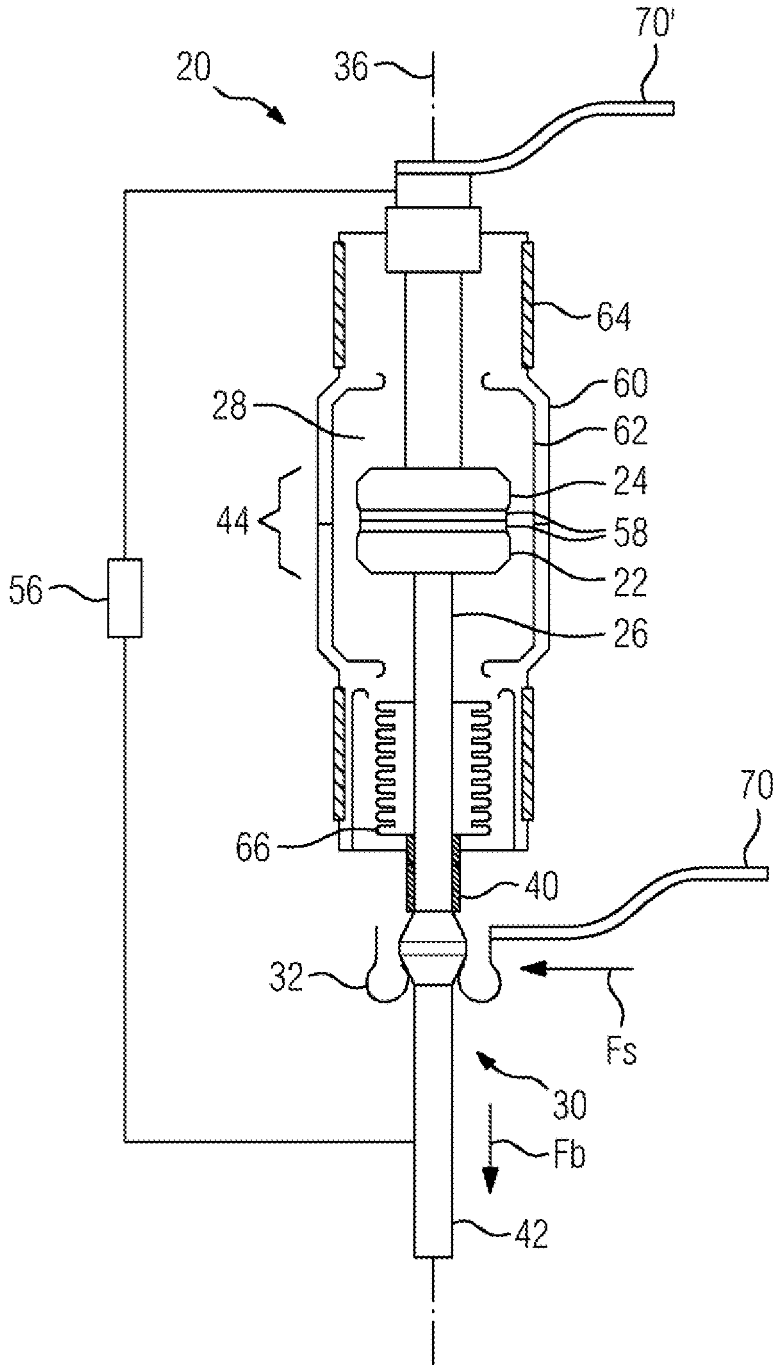

In FIGS. 5, 6 and 7, an analogous movement of the contacts 22 and 24 toward one another is described, as has already been explained in detail with respect to FIGS. 1 to 3. The difference of FIGS. 5 to 7 from FIGS. 1 to 3 resides in the fact that the electrical insulation between the spring contact 32 and the drive rod 26 in the open state 34 of the contacts 22 and 24 is effected by solid insulation, for example by polytetrafluoroethylene. The electrically insulating region 40 at the drive rod 26 is thus surrounded for example by a sleeve made of this solid insulation material and the spring contact 32 bears in an insulating manner there. During the movement of the drive rod 26, the spring contact moves analogously to FIG. 2 out of the electrically insulating region 40 and into an electrically conducting region 42. Thus, the drive rod 26 is brought into contact with the electric current path.

FIGS. 5 to 7 illustrate a similar cross-sectional variation 38-I to 38-IV to the case in FIGS. 1 to 3. In principle, this is not absolutely necessary in order to achieve a braking action of the drive rod 26 and of the contact 24 before meeting the contact 22. To this end, other measures would also be used, for example an increase in the force $F_s$ by which the spring contact 32 is pressed against the drive rod 26.

Figure 8:
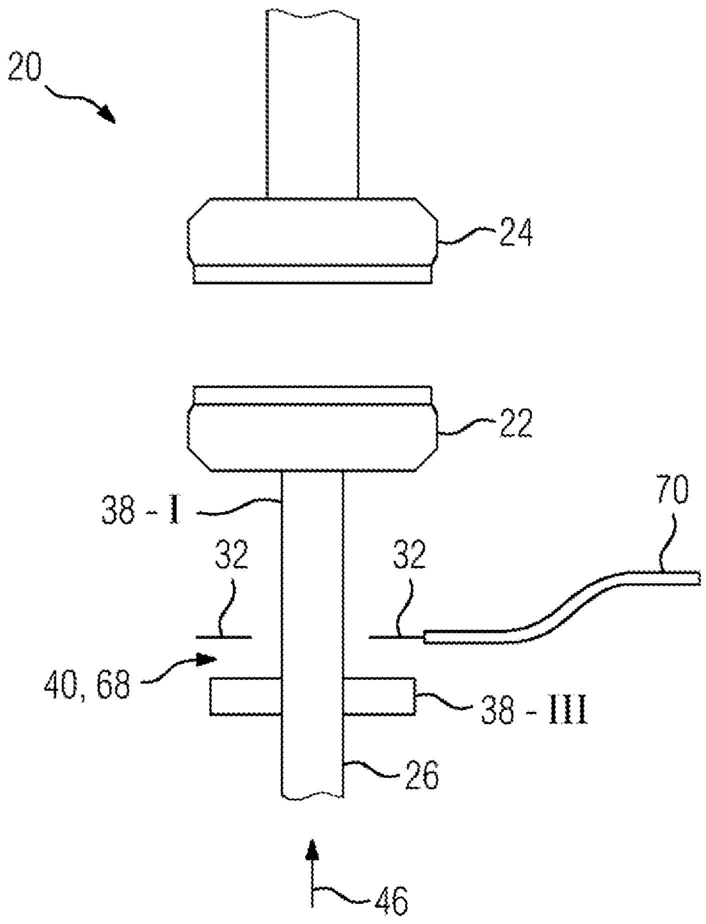
FIG. 8 shows a schematic illustration of an alternative illustration of the spring contact and the variation in the cross-sectional contour of the drive rod.

A further alternative configuration is illustrated very schematically in FIG. 8; FIG. 8 shows only the contacts 22 and 24 and the drive rod 26 and the spring contact 32 of the vacuum switching device 20, which is not illustrated fully here. When the closing movement takes place in the direction of the arrow 46, the spring contact 32, configured in the form of a flat spring, is pressed against a disk attached to the drive rod 26, wherein this construction also exhibits a variation in the cross-sectional contour 38-I to 38-IV. The narrowing region 52 and the thickening region 54 can in this case be configured to be very short along the switching axis and be reduced to zero. What is important is that the spring contact 32 is configured such that deliberate braking of the drive rod 26 and of the contact 22 can take place.

In principle, it should be noted that, in the open state 34 of the contacts, a defined potential, which results from the grid environment, should be applied to the drive rod. Moreover, it should be noted that the design of the contacts that are described in FIGS. 1 to 9 is purely by way of example, and in principle is also possible for pot contacts or pin-tulip contacts to be used for the described technological implementation.

The invention claimed is:

1. A vacuum switching device for a medium or high voltage, comprising:

a drive rod having, along a switching axis, an electrically insulating region and an electrically conducting region;

two contacts, at least one of said two contacts is mounted so as to be mechanically movable via said drive rod and at a same time is electrically connected to said drive rod;

a vacuum space in which said contacts are disposed; and a spring contact disposed outside said vacuum space, said drive rod, in a closed state of said contacts, is electrically connected to a power line via said spring contact, and in that said spring contact, in an open state of said contacts, is electrically insulated from said drive rod, said spring contact, in the open state of said contacts, bears on said electrically insulating region of said drive rod.

2. The vacuum switching device according to claim 1, wherein said drive rod has a cross-sectional contour that varies along a switching axis.

3. The vacuum switching device according to claim 2, wherein said cross-sectional contour of said drive rod is thickened in such a way that, during a closing movement of said drive rod along the switching axis, electrical contact is made between said drive rod and said spring contact.

4. The vacuum switching device according to claim 3, wherein said spring contact is subjected to elastic deformation while the electrical contact is being made.

5. The vacuum switching device according to claim 2, wherein said cross-sectional contour being a varying cross-sectional contour of said drive rod is configured in a rotationally symmetric manner.

6. The vacuum switching device according to claim 1, wherein said spring contact, in the open state of said contacts, is disposed in a contact-free manner with regard to said drive rod.

7. The vacuum switching device according to claim 1, further comprising a potential controller, said electrically conducting region of said drive rod has a defined potential being settable via said potential controller for said drive rod.

8. A vacuum switching device for a medium or high voltage, comprising:

a drive rod having a cross-sectional contour that varies along a switching axis;

two contacts, at least one of said two contacts is mounted so as to be mechanically movable via said drive rod and at a same time is electrically connected to said drive rod;

a vacuum space in which said contacts are disposed; and a spring contact disposed outside said vacuum space, said drive rod, in a closed state of said contacts, is electrically connected to a power line via said spring contact, and in that said spring contact, in an open state of said contacts, is electrically insulated from said drive rod, wherein said cross-sectional contour of said drive rod is thickened such that, during a closing movement of said drive rod along the switching axis, electrical contact is made between said drive rod and said spring contact, wherein said cross-sectional contour of said drive rod narrows again along the switching axis on a side facing away from said contact after a maximum thickening.

9. The vacuum switching device according to claim 8, wherein, in the closed state of said contacts, said spring contact bears in an elastically deformed state against a narrowing region of said cross-sectional contour of said drive rod.

* * * * *